(12) United States Patent
Kim

(10) Patent No.: US 7,361,240 B2
(45) Date of Patent: Apr. 22, 2008

(54) APPARATUS AND METHOD FOR FABRICATING LIQUID CRYSTAL DISPLAY

(75) Inventor: Kwang-Jin Kim, Gyeongsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 120 days.

(21) Appl. No.: 11/007,272

(22) Filed: Dec. 9, 2004

(65) Prior Publication Data

US 2005/0126679 A1    Jun. 16, 2005

(30) Foreign Application Priority Data

Dec. 13, 2003 (KR) .................. 10-2003-0090982

(51) Int. Cl.
*B32B 41/00* (2006.01)
*B05C 11/10* (2006.01)

(52) U.S. Cl. ............................. 156/64; 427/8
(58) Field of Classification Search ............. 156/64, 156/356, 357, 281, 389, 535; 427/8
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu |
| 5,548,429 A | 8/1996 | Tsujita |
| 5,642,214 A | 6/1997 | Ishii |
| 5,680,189 A | 10/1997 | Shiizu et al. |
| 5,742,370 A | 4/1998 | Kim |
| 5,757,451 A | 5/1998 | Miyazaki |
| 5,852,484 A * | 12/1998 | Inoue et al. .................. 349/86 |

(Continued)

FOREIGN PATENT DOCUMENTS

EP    1 003 066 A1    5/2000

(Continued)

*Primary Examiner*—George Koch
(74) *Attorney, Agent, or Firm*—McKenna Long & Aldridge LLP

(57) ABSTRACT

An apparatus for fabricating an LCD panel includes first and second alignment treatment units for performing alignment treatments on first and second base substrates, a seal pattern forming unit for forming at least one seal pattern on the alignment-treated first base substrate, a cleaning unit for cleaning the first base substrate on which the at least one seal pattern has been formed, a disconnection examining unit operatively coupled to the cleaning unit for examining the at least one seal pattern to determined the presence of defective breaks in the at least one seal pattern, first and second buffer units for temporarily holding the first and second base substrates, respectively, and an attaching unit for loading the temporarily held first and second base substrates and for attaching the loaded first and second base substrates.

8 Claims, 5 Drawing Sheets

U.S. PATENT DOCUMENTS

| | | |
|---|---|---|
| 5,854,664 A | 12/1998 | Inoue et al. |
| 5,861,932 A * | 1/1999 | Inata et al. ............... 349/156 |
| 5,875,922 A | 3/1999 | Chastine et al. |
| 5,952,676 A | 9/1999 | Sato |
| 5,956,112 A | 9/1999 | Fujimori |
| 6,001,203 A | 12/1999 | Yamada |
| 6,011,609 A | 1/2000 | Kato |
| 6,016,178 A | 1/2000 | Kataoka |
| 6,016,181 A | 1/2000 | Shimada |
| 6,055,035 A | 4/2000 | Von Gutfeld |
| 6,163,357 A | 12/2000 | Nakamura |
| 6,219,126 B1 | 4/2001 | Von Gutfeld |
| 6,226,067 B1 | 5/2001 | Nishiguchi |
| 6,236,445 B1 | 5/2001 | Foschaar |
| 6,304,306 B1 | 10/2001 | Shiomi |
| 6,304,311 B1 | 10/2001 | Egami |
| 6,309,691 B1 * | 10/2001 | Hasegawa ............... 427/8 |
| 6,337,730 B1 | 1/2002 | Ozaki |
| 6,414,733 B1 | 7/2002 | Ishikawa |
| 6,573,968 B2 * | 6/2003 | Jeong ............... 349/153 |
| 2002/0176928 A1 * | 11/2002 | Minami et al. ............... 427/8 |
| 2003/0123017 A1 * | 7/2003 | Kim et al. ............... 349/153 |
| 2003/0223029 A1 * | 12/2003 | Lee ............... 349/153 |
| 2004/0090589 A1 * | 5/2004 | Jung et al. ............... 349/187 |

FOREIGN PATENT DOCUMENTS

| | | |
|---|---|---|
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |

| | | | | | |
|---|---|---|---|---|---|
| JP | 2001-166272 | 6/2001 | JP | 2002-139734 | 5/2002 |
| JP | 2001-166310 | 6/2001 | JP | 2002-156518 | 5/2002 |
| JP | 2001-183683 | 7/2001 | JP | 2002-169166 | 6/2002 |
| JP | 2001-201750 | 7/2001 | JP | 2002-169167 | 6/2002 |
| JP | 2001-209052 | 8/2001 | JP | 2002-182222 | 6/2002 |
| JP | 2001-209056 | 8/2001 | JP | 2002-202512 | 7/2002 |
| JP | 2001-209057 | 8/2001 | JP | 2002-202514 | 7/2002 |
| JP | 2001-209058 | 8/2001 | JP | 2002-214626 | 7/2002 |
| JP | 2001-209060 | 8/2001 | JP | 2002-229042 | 8/2002 |
| JP | 2001-215459 | 8/2001 | JP | 2002-236276 | 8/2002 |
| JP | 2001-222017 | 8/2001 | JP | 2002-258299 | 8/2002 |
| JP | 2001-253758 | 8/2001 | JP | 2002-236292 | 9/2002 |
| JP | 2001-255542 | 9/2001 | JP | 2002-277865 | 9/2002 |
| JP | 2001-264782 | 9/2001 | JP | 2002-277866 | 9/2002 |
| JP | 2001-272640 | 10/2001 | JP | 2002-277881 | 9/2002 |
| JP | 2001-281675 | 10/2001 | JP | 2002-287156 | 10/2002 |
| JP | 2001-281678 | 10/2001 | JP | 2002-296605 | 10/2002 |
| JP | 2001-282126 | 10/2001 | JP | 2002-311438 | 10/2002 |
| JP | 2001-305563 | 10/2001 | JP | 2002-311440 | 10/2002 |
| JP | 2001-330837 | 11/2001 | JP | 2002-311442 | 10/2002 |
| JP | 2001-330840 | 11/2001 | JP | 2002-323687 | 11/2002 |
| JP | 2001-356353 | 12/2001 | JP | 2002-323694 | 11/2002 |
| JP | 2001-356354 | 12/2001 | JP | 2002-333628 | 11/2002 |
| JP | 2002-014360 | 1/2002 | JP | 2002-333635 | 11/2002 |
| JP | 2002-023176 | 1/2002 | JP | 2002-333843 | 11/2002 |
| JP | 2002-049045 | 2/2002 | JP | 2002-341329 | 11/2002 |
| JP | 2002-079160 | 3/2002 | JP | 2002-341355 | 11/2002 |
| JP | 2002-080321 | 3/2002 | JP | 2002-341356 | 11/2002 |
| JP | 2002-082340 | 3/2002 | JP | 2002-341357 | 11/2002 |
| JP | 2002-090759 | 3/2002 | JP | 2002-341358 | 11/2002 |
| JP | 2002-090760 | 3/2002 | JP | 2002-341359 | 11/2002 |
| JP | 2002-107740 | 4/2002 | JP | 2002-341362 | 11/2002 |
| JP | 2002-122870 | 4/2002 | JP | 2002-350876 | * 12/2002 |
| JP | 2002-122872 | 4/2002 | KR | 2000-0035302 | 6/2000 |
| JP | 2002-122873 | 4/2002 | | | |
| JP | 2002-131762 | 5/2002 | | | |

* cited by examiner

APPARATUS AND METHOD FOR FABRICATING LIQUID CRYSTAL DISPLAY

This application claims the benefit of Korean Patent Application No. 90982/2003, filed on Dec. 13, 2003, which is hereby incorporated by reference for all purposes as if fully set forth herein.

BACKGROUND OF THE INVENTION

1. Field of the Invention

The present invention relates to an apparatus and a method for fabricating liquid crystal display (LCD) panels. More particularly, the present invention relates to an apparatus and a method for efficiently examining seal patterns used in attaching substrate together.

2. Discussion of the Related Art

Generally, LCD devices display images by applying data signals to an array of pixels to thereby control light transmittance characteristics of the pixels, wherein the data signals are derived from external image information. A typical LCD device includes a unit LCD panel having a plurality of pixels arranged in a matrix pattern, and gate and data driving units for driving the pixels.

The LCD panel typically includes a color filter substrate attached to a thin film transistor (TFT) array substrate by a seal pattern formed at a peripheral region of an image display area. The attached color filter and TFT array substrates are separated from each other to define a cell-gap that contains a liquid crystal layer.

The color filter substrate supports a common electrode while the TFT array substrate supports a plurality of gate lines, a plurality of data lines crossing the plurality of gate lines to define a plurality of pixels, a plurality of TFTs arranged at crossings of each of the gate and data lines, and a plurality of pixel electrodes electrically connected to corresponding ones of the TFTs. Alignment films, formed on opposing surfaces of the TFT array and color filter substrates, are rubbed to induce a predetermined orientation of molecules within the liquid crystal layer.

The data lines transmit data signals, supplied from the data driving unit, to the pixels while the gate lines transmit scan signals, supplied from the gate driving unit, to the pixels. In response to scan signals, sequentially supplied from the gate driver, the TFTs switch data signals transmitted by the data lines to corresponding pixel electrodes.

When data and reference signals are applied to the pixel and common electrodes, respectively, an electric field is generated within the liquid crystal layer. Due to anisotropic dielectric properties of molecules within the liquid crystal layer, the generated electric field rotates liquid crystal molecules between the common electrodes and the pixel electrodes. When the liquid crystal molecules rotate, the light transmittance characteristics of the pixels change. Thus, by controlling the magnitude of the generated electric field via the data and reference signals, light transmittance characteristics of the plurality of pixels may be controlled to display an image.

FIG. 1 illustrates a plan view of a related art LCD panel.

Referring to FIG. 1, the related art LCD panel 100 includes an image display area 113 having a plurality of pixels are arranged in a matrix pattern, a gate pad area 114 containing a plurality of gate pads that are connected to gate lines in the image display area 113, and a data pad area 115 containing a plurality of data pads that are connected to data lines in the image display area 113.

The image display area 113 generally includes the portion of a TFT array substrate 101 that is overlapped by a color filter substrate 102. Accordingly, the image display area 113 typically includes the portion of the TFT array substrate 101 that supports a plurality of gate and data lines crossing each other to define pixels, pixel electrodes formed within the pixels, and TFTs arranged at crossings of the gate and data lines and connected to corresponding pixel electrodes for driving the pixel electrodes. A protecting film (not shown) is formed over the entire surface of the TFT array substrate 101 to protect the pixel electrodes and the TFTs. Further, the image display area 113 typically includes the portion of the color filter substrate 102 that supports a black matrix, a plurality of color filters separated by the black matrix, and a common transparent electrode opposing the pixel electrodes.

The gate pad and data pad areas 114 and 115 are found at edges of the TFT array substrate 101 that are not overlapped by the color filter substrate 102. Accordingly, the gate pad area 114 includes a plurality of gate pads that transmit scan signals, supplied by a gate driving unit (not shown), to corresponding ones of the gate lines. Similarly, the data pad area 115 includes a plurality of data pads that transmit image information, supplied by a data driving unit (not shown), to corresponding ones of the data lines.

The TFT array substrate 101 and the color filter substrate 102 are joined to, and spaced apart from, each other via a seal pattern 116 formed at the periphery of the image display area 113 to define a cell-gap. Uniformity of the cell gap is maintained by a spacer structure (not shown) and a liquid crystal layer is formed within the cell gap.

Recently, a process has been developed that facilitates the simultaneous fabrication of a plurality of the LCD panels (such as those shown in FIG. 1), thereby increasing the production yield of such LCD panels. Typically, a plurality of TFT array substrates 101 are formed on a first base substrate, larger than each individual TFT array substrate 101; a plurality of color filter substrates 102 are formed on a second base substrate, larger than each individual color filter substrate 102; the first and second base substrates are joined to each other via the seal pattern 116; and the joined first and second base substrates are then cut and processed to form individual (i.e., unit) LCD panels 100.

A liquid crystal injection hole is often formed in the seal pattern 116 and, after the joined first and second base substrates are cut, liquid crystal material can be injected through the liquid crystal injection hole and into the cell-gap of each unit LCD panel 100 to form the liquid crystal layer. Subsequently, the liquid crystal injection hole is sealed to prevent leakage of the injected liquid crystal material outside the image display area 113.

To ensure the reliability of each LCD panel 100, the seal pattern 116 must be examined to determine the presence of any defective breaks in the seal pattern 116 (i.e., breaks in the seal pattern 116 not including the liquid crystal injection hole). Generally, such examination is performed with an operator's naked eye wherein the operator stops the LCD panel production line after forming seal patterns 116 on a predetermined number of substrates (e.g., three or four), opens the seal pattern forming equipment, illuminates a seal pattern 116 with a lamp, and examines the seal pattern 116.

During the examination process described above, foreign material can be introduced onto the substrate when the seal pattern forming equipment is opened and/or when the operator actually examines the seal pattern 116. When introduced onto either the TFT array or color filter substrates 101 or 102, the foreign material creates a defective LCD panel 100.

Moreover, because the examination process is performed only periodically, there is an increased likelihood that seal patterns 116 with defective breaks (e.g., breaks in portions of the seal pattern 116 other than the liquid crystal injection hole), will pass through the seal pattern forming equipment undetected, increasing the risk of forming an LCD panel 100 with a defective seal pattern 116. If liquid crystal material is subsequently injected into LCD panels having defective seal patterns 116, liquid crystal material may leak from the image display area 113 and/or the defective breaks in the seal pattern 116 must be sealed. As a consequence, material expenses incurred during LCD panel fabrication increase. Lastly, because an operator must stop the LCD panel production line to opens the seal pattern forming equipment to examine the seal pattern 116, and then restart the LCD panel production line to resume fabrication of the LCD panels, the related art examination process reduces the efficiency with which LCD panels 100 are fabricated.

SUMMARY OF THE INVENTION

Accordingly, the present invention is directed to an apparatus and a method for fabricating an LCD panel that substantially obviates one or more of the problems due to limitations and disadvantages of the related art.

An advantage of the present invention provides an apparatus and a method for fabricating an LCD panel that can increase the reliability of a seal pattern examination process while reducing the time required to perform such an examination process.

Another advantage of the present invention provides an apparatus and a method for fabricating an LCD panel that can minimize the introduction of foreign materials onto a substrate and can increase the efficiency with which LCD panels are fabricated.

Still another advantage of the present invention provides an apparatus and a method for fabricating an LCD panel whereby subsequent processes are not performed on LCD panels having defective seal patterns, thereby minimizing the material expenses incurred during LCD panel fabrication.

Yet another advantage of the present invention provides an apparatus and a method for fabricating an LCD panel incorporating a buffer unit, thereby allowing seal patterns of consecutively-loaded substrates to be examined without stopping the LCD panel production line.

Still a further advantage of the present invention provides an apparatus and a method for fabricating an LCD panel capable of efficiently operating an LCD panel production line.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for fabricating an LCD panel may, for example, include first and second alignment treatment units for performing alignment treatments on first and second base substrates, a seal pattern forming unit for forming at least one seal pattern on the alignment-treated first base substrate, a cleaning unit for cleaning the first base substrate on which the at least one seal pattern has been formed, a disconnection examining unit operatively coupled to the cleaning unit for examining the at least one seal pattern to determined the presence of defective breaks in the at least one seal pattern, first and second buffer units for temporarily holding the first and second base substrates, respectively, and an attaching unit for loading the temporarily held first and second base substrates and for attaching the loaded first and second base substrates.

According to principles of the present invention, a method of fabricating a liquid crystal display panel may, for example, include performing a first alignment treatment on a first base substrate, performing a second alignment treatment on a second base substrate, forming at least one seal pattern on the alignment-treated first base substrate, aligning the first base substrate having the at least one seal patterned formed thereon within a disconnection examination unit, within the disconnection examination unit, driving a disconnection camera along the at least one seal pattern to detect an image of the at least one seal pattern and identify the presence of defective breaks in the at least one seal pattern, cleaning the first base substrate on which the at least one seal pattern has been formed, and attaching the first and second base substrates via the at least one seal pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
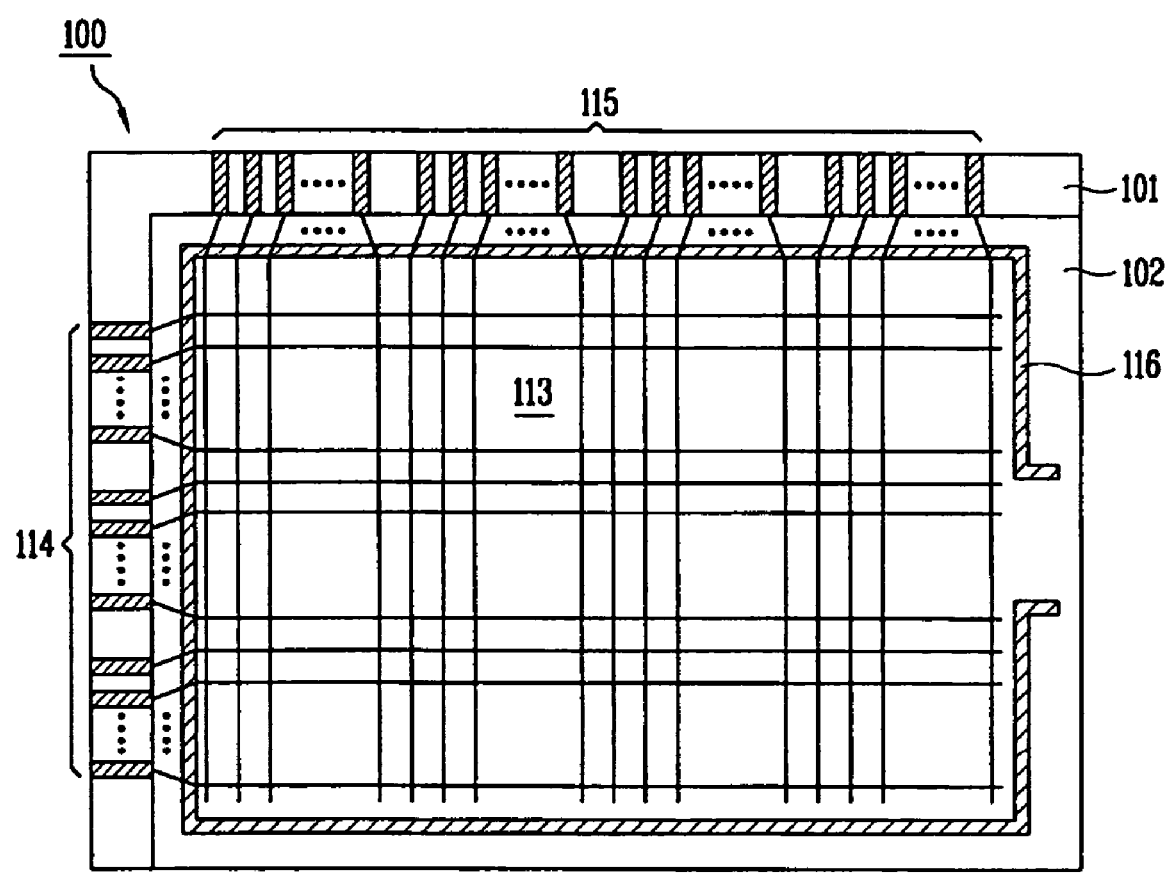
FIG. 1 illustrates a plan view of a related art LCD panel.
Figure 2:
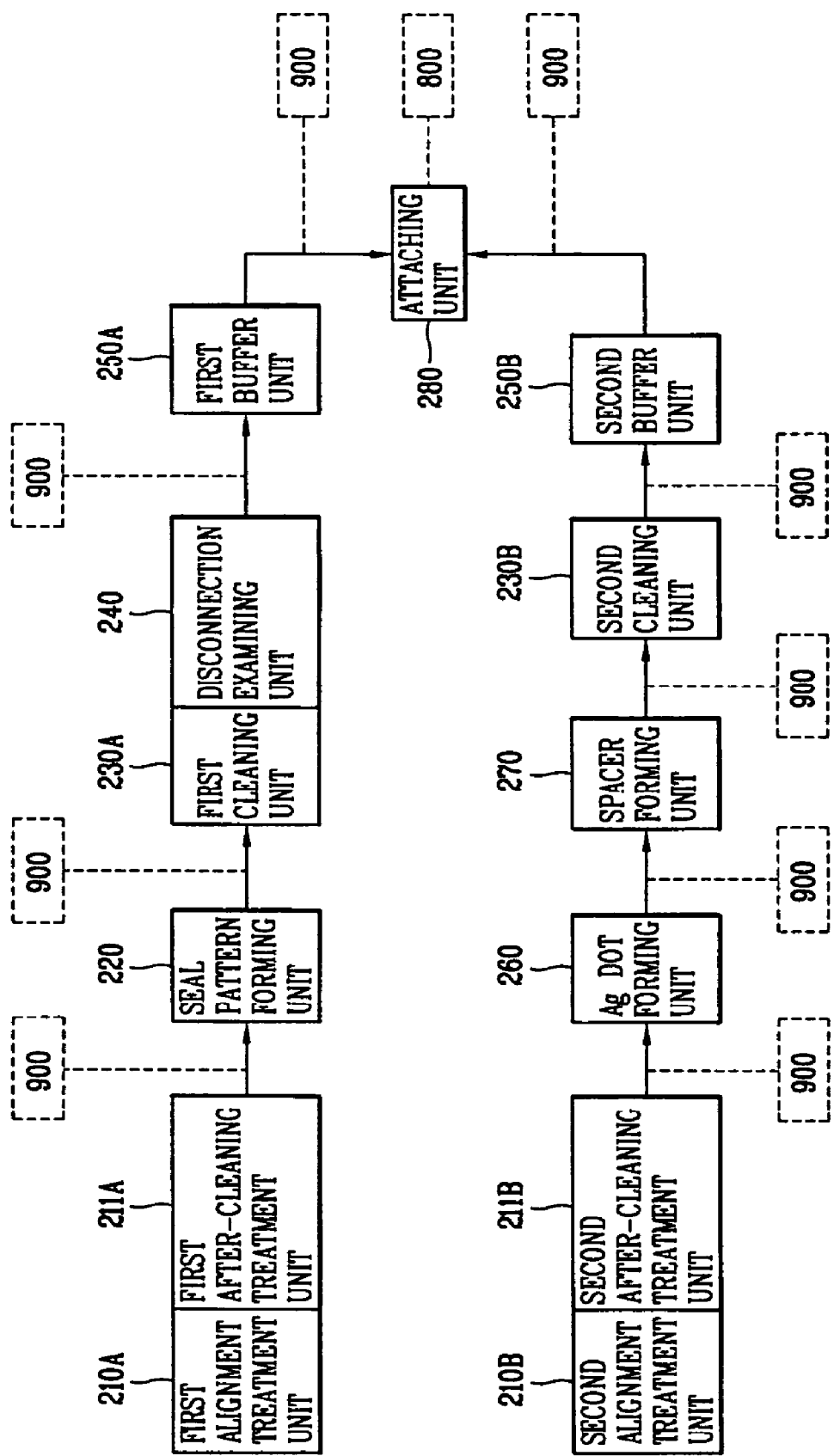
FIG. 2 illustrates an exemplary block diagram of an apparatus for fabricating an LCD panel in accordance with principles of the present invention.

FIG. 2 illustrates an exemplary block diagram of an apparatus for fabricating an LCD panel in accordance with principles of the present invention.

Referring to FIG. 2, the principles of the present invention provide an apparatus for fabricating an LCD panel. The apparatus may, for example, include first and second alignment treatment units 210A and 210B for forming alignment films on respective ones of the first and second base substrates; a seal pattern forming unit 220 for forming seal patterns on the alignment-treated first base substrate; a first cleaning unit 230A for cleaning the first base substrate, on which the seal patterns have been formed; a disconnection examining unit 240 coupled to the first cleaning unit 230A for examining the first base substrate to determine the existence of defective breaks in the seal patterns formed thereon; a first buffer unit 250A for buffering (i.e., temporarily holding) the examined first base substrate; an Ag dot forming unit 260 for forming Ag dots on the alignment-treated second base substrate; a spacer forming unit 270 for forming spacers on the second substrate, on which the Ag dots have been formed; a second cleaning unit 230B for cleaning the second substrate, on which the spacers have been formed; a second buffer unit 250B for buffering (i.e., temporarily holding) the cleaned second base substrate; and an attaching unit 280 for loading the first and second base substrates, temporarily held by respective ones of the first and second buffer units 250A and 250B, and for attaching the loaded first and second base substrates to each other.

In one aspect of the present invention, the first base substrate may constitute a substrate on which one or more color filter substrates have been formed. Similarly, the second base substrate may constitute a substrate on which one or more TFT array substrates have been formed.

According to principles of the present invention, the first and second alignment treatment units 210A and 210B may form alignment films on the surfaces of the first and second substrates, respectively. In forming the alignment films, an alignment treatment may be performed to impart a predetermined orientation to liquid crystal molecules in a subsequently provided liquid crystal layer. For example, the predetermined orientation may coincide with a direction of polymer chains found on the surface of the alignment films. Accordingly, the alignment treatment may, for example, involve a rubbing process (e.g., where fabric material is rubbed against the surface of the alignment films with substantially constant pressure and speed), an irradiation process (e.g., where light of having a suitable wavelength and predetermined intensity is irradiated onto the surface of the alignment films at a predetermined angle), or the like.

In one aspect of the present invention, the apparatus may further include first and second after-alignment treatment cleaning units 211A and 211B, respectively, coupled to respective ones of the first and second alignment treatment units 210A and 210B. The after-alignment treatment cleaning units may be used to suitably clean respective ones of the first and second base substrates after the alignment films have been formed thereon.

According to principles of the present invention, the seal pattern forming unit 220 may form seal patterns on the surface of the first base substrate after it has been alignment-treated by the first alignment treatment unit 210A. The seal patterns may be substantially leveled within the seal pattern forming unit 220 by evaporating a solvent contained within the seal patterns. Further, the seal pattern forming unit 220 may cool the first base substrate. While the seal pattern forming unit 220 has been described above as being provided to form seal patterns on the alignment-treated first base substrate, it will be appreciated that the seal pattern forming unit 220 shown in FIG. 2 may, supplemental or alternatively, be provided to form seal patterns on the alignment-treated second base substrate.

According to principles of the present invention, the seal pattern forming unit 220 may form seal patterns having different configurations and form seal patterns according to many methods. Illustrative examples of seal pattern configurations and seal pattern forming methods will be discussed in greater detail below with respect to FIGS. 3A, 3B, 4, and 5.

Figure 3A:
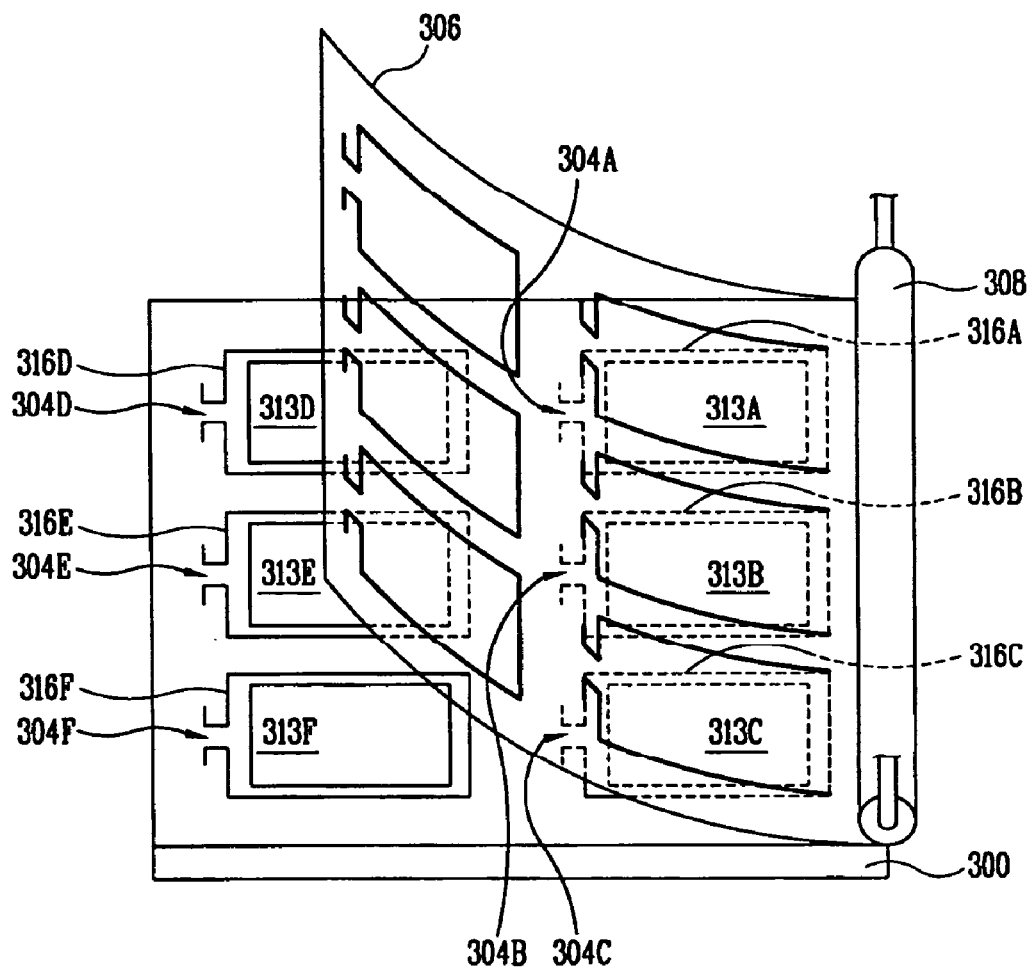
FIGS. 3A and 3B illustrate a first exemplary method of forming seal patterns as applied by the seal pattern forming unit shown in FIG. 2.
Figure 3B:
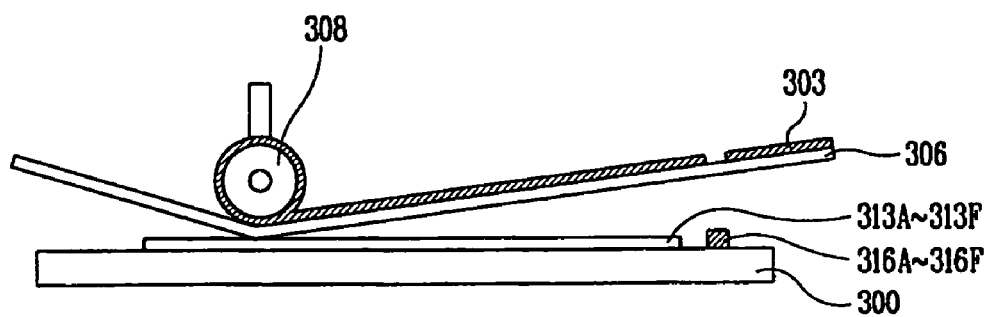

Referring to FIGS. 3A and 3B, the seal pattern forming unit 220 may, for example, include equipment capable of forming seal patterns according to a screen printing method. Accordingly, the seal pattern forming unit 220 may include a patterned screen mask 306, selectively exposing peripheral regions of a plurality of image display areas 313A to 313F formed on a base substrate 300, and a squeegee 308 for supplying sealant 303 to regions of the base substrate 300 exposed by the patterned screen mask 306, thereby simultaneously forming a plurality of seal patterns 316A to 316F at the peripheral regions of the image display areas 313A to 313F.

Each seal pattern 316A to 316F formed on the base substrate 300 may include a liquid crystal injection hole 304A to 304F, respectively, through which liquid crystal material may be subsequently injected to form a liquid crystal layer after the base substrate 300 has been attached to another base substrate (not shown). After injecting the liquid crystal material, the liquid crystal injection hole may be sealed to prevent liquid crystal material from leaking outside the image display area 313A to 313F.

Figure 4:
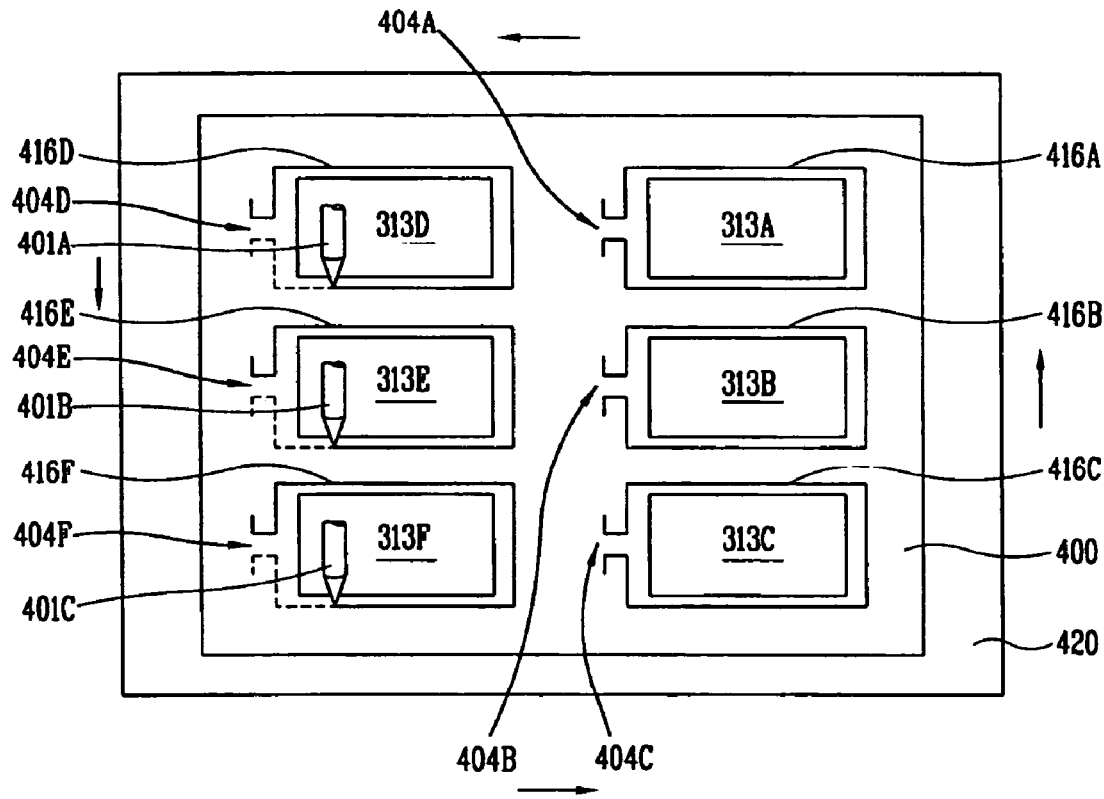
FIG. 4 illustrates a second exemplary method of forming seal patterns as applied by the seal pattern forming unit shown in FIG. 2.

Referring to FIG. 4, the seal pattern forming unit 220 may, for example, include equipment capable of forming seal patterns according to a sealant dispensing method. Accordingly, the seal pattern forming unit 220 may include a table 420, supporting a base substrate 400, and a plurality of syringes 401A to 401C for dispensing sealant (e.g., applying an imputer pressure to sealant within the syringe) contained therein directly onto peripheral regions of a plurality of image display areas 413A to 413F formed on the base substrate 400, thereby forming a plurality of seal patterns 416A to 416F simultaneously within each row of peripheral regions of image display areas 413A to 413F. In one aspect of the present invention, the number of syringes 401A to 401C used may, for example, be equal to the number of image display areas disposed within one row or column of image display areas formed on the base substrate 400. In one aspect of the present invention, the table 420 may be laterally translated along left, right, forward, and backward directions while sealant is dispensed from the syringes 401A to 401C to form the seal patterns 416A to 416F. In another aspect of the present invention, the syringes 401A to 401C may be laterally translated along left, right, forward, and backward directions while sealant is dispensed therefrom to form the seal patterns 416A to 416F. In still another aspect of the present invention, both the table 420 and the syringes 401A to 401C may be cooperatively laterally translated along left, right, forward, and backward directions while sealant is dispensed from the syringes 401A to 401C to form the seal patterns 416A to 416F.

Each seal pattern 416A to 416F formed on the base substrate 400 may include a respective liquid crystal injection hole 404A to 404F through which liquid crystal material may be subsequently injected to form a liquid crystal layer after the base substrate 400 has been attached to another base substrate (not shown). After injecting the liquid crystal material, the liquid crystal injection hole may be sealed to prevent liquid crystal material from leaking outside the image display area 413A to 413F.

As described above, the seal patterns 316A to 316F and 416A to 416F include liquid crystal injection holes through which liquid crystal material may be injected to form a liquid crystal layer. In one aspect of the present invention, the liquid crystal material may be injected according to a vacuum injection method. Thus, in practicing the vacuum injection method, a unit LCD panel (i.e., a TFT array and color filter substrate that has been separated from a pair of first and second base substrates attached together via a seal pattern having a liquid crystal injection hole) may be introduced into a vacuum chamber. The pressure within the vacuum chamber may then be reduced and the liquid crystal injection hole may be caused to contact a reservoir of liquid crystal material provided within the vacuum chamber. Subsequently, the pressure within the vacuum chamber may be increased, causing liquid crystal material within the reservoir to be injected through the liquid crystal injection hole and into the cell gap of the unit LCD panel. After the cell gap is suitably filled with liquid crystal material, the liquid crystal injection hole may be sealed to prevent liquid crystal leakage from the unit LCD panel.

Figure 5:
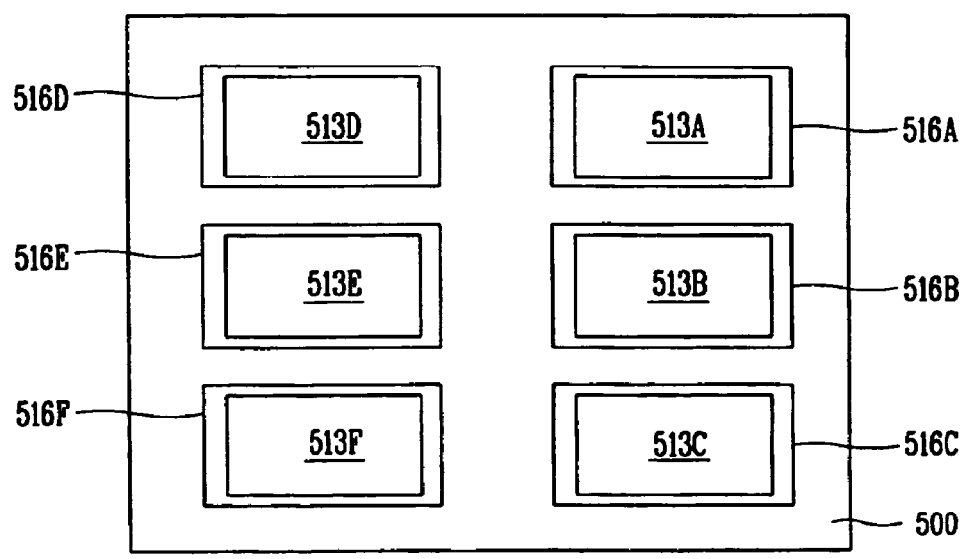
FIG. 5 illustrates an exemplary alternative to the seal pattern shown in FIGS. 3A and 4.

As described above, the seal pattern forming unit 220 may form seal patterns with liquid crystal injection holes defined therein. Referring to FIG. 5, however, the seal pattern forming unit 220 may also, using the processes described above, form seal patterns 516A to 516F having closed shapes (i.e., without liquid crystal injection holes) that surround peripheral regions of respective ones of image display areas 513A to 513F, formed on a substrate 500.

Where, as shown in FIG. 5, the seal patterns 516A to 516F are formed without liquid crystal injection holes, a liquid crystal layer may be formed within the image display areas 513A to 513F of the substrate 500 according to a liquid crystal dispensing method. Thus, in practicing the liquid crystal dispensing method, practicing the dispensing method, droplets of liquid crystal material may be directly dispensed onto the image display areas 513A to 513F of the base substrate 500. After dispensing the liquid crystal material, the base substrate 500 may be attached to another base substrate (not shown). Pressure employed in attaching the two base substrates may be used to evenly spread and distribute the dispensed liquid crystal material to the edges of the image display areas 513A to 513F to form the liquid crystal layer. The attached base substrates may then be cut to separate the unit LCD panels.

Referring back to FIG. 2, and in accordance with the principles of the present invention, the first substrate is transferred to the first cleaning unit 230A to be cleaned after the seal pattern forming unit 220 forms and levels the seal patterns and cools the first substrate.

According to principles of the present invention, the disconnection examining unit 240 may be coupled to the first cleaning unit 230A and may examine the seal patterns formed by the seal pattern forming unit 220 to determine the presence of any defective breaks in the seal patterned formed.

Figure 6:
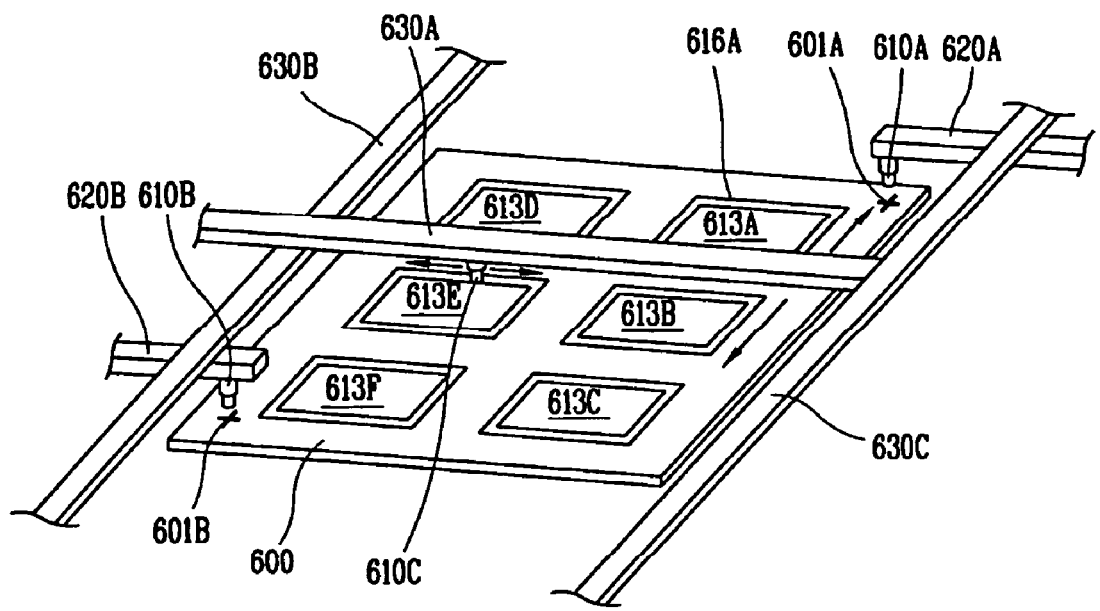
FIG. 6 illustrates the disconnection examining unit, shown in FIG. 2, in accordance with principles of the present invention.

FIG. 6 illustrates the disconnection examining unit, shown in FIG. 2, in accordance with principles of the present invention.

Referring to FIG. 6, the disconnection examining unit 240 may, for example, include first and second alignment cameras 610A and 610B, first and second support shafts 620A and 620B that support the first and second alignment cameras 610A and 610B, respectively, a disconnection camera 610C that detects and magnifies images of seal patterns 616A to 616F formed at peripheral regions of image display units 613A to 613F formed on the substrate 600, a third support shaft 630A that support and drive the disconnection camera 610C along right and left directions, and fourth and fifth support shafts 630B and 630C coupled to opposing portions of the third support shaft 630A that drive the third support shaft 630A along forward and backward directions.

In one aspect of the present invention, the first and second alignment cameras 610A and 610B may visually detect images of first and second alignment marks 601A and 601B formed at peripheral regions of substrate 600 and aid in aligning the substrate 600 internally, within the disconnection examining unit 240.

It should be noted that, while the seal patterns 616A to 616F are illustrated as being closed, they may also be formed to include the aforementioned liquid crystal injection holes. Further, the seal patterns 616A to 616F may be formed according to the aforementioned screen printing or dispensing methods. Accordingly, the liquid crystal layer of each unit LCD panel may be formed according to the vacuum injection method or the liquid crystal dispensing method, depending on the structure of each sealant pattern 616A to 616F.

According to principles of the present invention, the third to fifth support shafts 630A to 630C may transfer the disconnection camera 610C along the forward, backward, right, and left directions to substantially align the disconnection camera 610C with each of the seal patterns 616A to 616F, allowing images of the seal patterns 616A to 616F to be detected and magnified. In one aspect of the present invention, the first and second support shafts 620A and 620B may be positioned above or beneath the third to fifth support shafts 630A to 630C, preventing their collision with the third to fifth support shafts 630A to 630C.

According to principles of the present invention, the disconnection camera 610C may be transferred along the seal patterns 616A to 616F by cooperatively driving the third to fifth support shafts 630A to 630C to detect and magnify the images of the seal patterns 616A to 616F. The detected and magnified images may be transmitted to an operator who uses the detected and magnified images to determine the existence of defective breaks within the seal patterns 616A to 616F. In one aspect of the present invention, the defective breaks may be physically manifested as partial-thickness breaks (e.g., scratches in a surface of the seal pattern) or full-thickness breaks (e.g., complete disconnections between adjacent portions of the seal pattern). In another aspect of the present invention, the disconnection examining unit 240 may include one disconnection camera 610C. In still another aspect of the present invention, the disconnection examining unit 240 may include a plurality of disconnection cameras 610C to correspond to the number of image display areas arranged within rows and/or columns on the substrate 600. By providing a plurality of disconnection cameras 610C, the total amount of time required to examine every seal pattern 616A to 616F may be reduced.

According to principles of the present invention, the disconnection examining unit 240 may, for example, include a memory unit that receives and stores detected data corresponding to images of the seal patterns 616A to 616F detected by the disconnection camera 610C (e.g., detected line widths of the actual seal patterns 616A to 616F formed on substrate 600) as well as reference data corresponding to predetermined reference line widths of predetermined reference seal patterns; a comparing unit that compares the detected data and the reference data stored in the memory unit and that outputs a control signal if a difference between the detected and reference data exceeds a predetermined threshold value; and an alarm generating unit that receives the control signal output by the control unit and that generates an alarm based on the received control signal.

Accordingly, when a difference between the detected line width of a seal pattern and a predetermined reference line width of the seal pattern exceeds the predetermined threshold value, a defective break, as described above, exists in the actual seal pattern formed on the substrate 600. Thus, even if an operator does not continuously monitor images of the seal patterns 616A to 616F, detected and magnified by the disconnection camera 610C, the alarm generating unit may generates an alarm, indicating the existence of a defective seal pattern. Accordingly, the principles of the present invention provide a highly reliable seal pattern examination process which, in turn, improves the production yield and efficiency of the LCD panel fabrication process.

Referring back to FIG. 2, the seal patterns 616A to 616F may be examined in the disconnection examining unit 240, as described above, before and/or after the base substrate 600 is loaded into, and cleaned by, the first cleaning unit 230A. After the later of the cleaning and examination operations has been performed, the first base substrate may be transferred to the first buffer unit 250A and be temporarily held.

According to principles of the present invention, the Ag dot forming unit 260 may form a plurality of Ag dots on the second base substrate after the second substrate has been alignment-treated by the second alignment treatment unit 210B. While the Ag dot forming unit 260 has been described above as being provided to form the Ag dots on the alignment-treated second base substrate, it will be appreciated that the Ag dot forming unit 260 shown in FIG. 2 may, supplemental or alternatively, be provided to form Ag does on the alignment-treated first base substrate.

Figure 7:
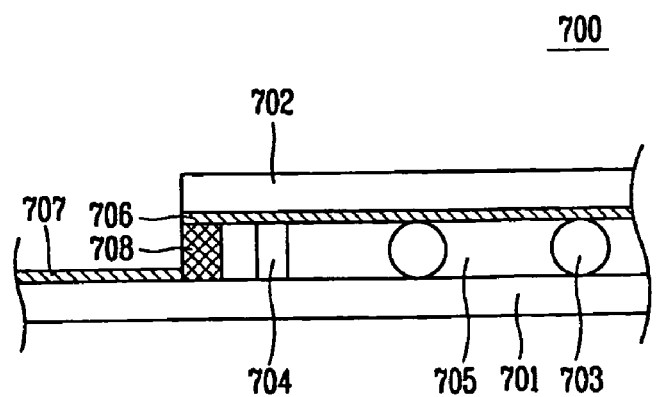
FIG. 7 illustrates a sectional view along an edge of an LCD fabricated in accordance with principles of the present invention.

FIG. 7 illustrates a sectional view along an edge of an LCD fabricated in accordance with principles of the present invention.

Referring to FIG. 7, a unit LCD panel 700 may, for example, include a TFT array substrate 701 and a color filter substrate 702 attached by a seal pattern 704. The cell-gap between the TFT array and color filter substrates 701 and 702, respectively, may be maintained substantially uniform by spacers 703. Moreover, a liquid crystal layer 705 may be provided within the cell-gap.

Portions of the TFT array substrate 701 may not be overlapped by the color filter substrate 702. In these non-overlapped portions, a plurality of gate pads (not shown) are formed within a gate pad area on the TFT array substrate 701 and a plurality of data pads (not shown) are formed within a data pad area on the TFT array substrate 701. The gate pads may be connected to corresponding ones of a plurality of gate lines arranged within an image display area of the TFT array substrate 701 while the data pads may be connected to corresponding ones of a plurality of data lines arranged within the image display area of the TFT array substrate 701. The plurality of gate lines may substantially orthogonally cross each other to define an array of pixels. TFTs (not shown) may be provided at the crossings of the gate and data lines and be connected to corresponding pixel electrodes (not shown) arranged within each pixel. Accordingly, the TFTs may switch data signals, transmitted by corresponding ones of the data lines, to corresponding pixel electrodes in response to sequentially applied scan signals transmitted by the gate lines.

The color filter substrate 702 may, for example, support a black matrix (not shown), a plurality of color filters (not shown) separated by the black matrix, and at least one common electrode 706 opposing the plurality of pixel electrodes.

According to principles of the present invention, a common voltage line 707 may be formed on the TFT array substrate 701 to apply the common voltage to at least one common electrode 706. In one aspect of the present invention, Ag dots 708 may be formed on either the TFT array substrate 701 or on the color filter substrate 702 to electrically connect the common voltage line 707 to at least one common electrode 706, enabling a common voltage to be transmitted from the common voltage line 707 to at least one common electrode 706. In another aspect of the present invention, each unit LCD panel may include one or more Ag dots 708.

When common and signal voltages are supplied to the at least one common electrode 706 and the pixel electrodes, respectively, an electric field may be generated therebetween and through portions of the liquid crystal layer 705. Accordingly, and as shown in FIG. 7, a vertically oriented electric field may be generated between the common and pixel electrodes to drive the liquid crystal layer 705. Alternatively, the at least one common electrode 706 may be formed on the same substrate (e.g., the TFT array substrate 701) to drive the liquid crystal layer 705 using a horizontally-oriented electric field. Where both the common and pixel electrodes are formed on the TFT array substrate 701, the resultant LCD panel is known as an in-plane switching (IPS) mode LCD panel. In such an IPS mode LCD panel, the Ag dots 708 need not formed.

Referring back to FIG. 2, the spacer forming unit 270 may, for example, form spacers on the second substrate on which the Ag dots have been formed. In one aspect of the present invention, the spacers may substantially maintain a uniform thickness of the cell-gap between the attached first and second substrates. While the spacer forming unit 270 has been described above as being provided to form spacers on the second base substrate, on which the Ag dots have been formed, it will be appreciated that the spacer forming unit 270 shown in FIG. 2 may, supplemental or alternatively, be provided to form spacers on the first base substrate, on which the seal patterns have been formed.

According to principles of the present invention, the spacer forming unit 270 may form spacers having different configurations according to many methods, illustrative examples of which will be discussed in greater detail below.

In one aspect of the present invention, the spacer forming unit 270 may, for example, include equipment capable of forming spacers according to a scattering method. In practicing the scattering method, spacers are formed by scattering glass and/or plastic beads having a predetermined diameter on the first or second substrates with a suitably regular, or random, scatter density within the image display area of the LCD panel.

In another aspect of the present invention, the spacer forming unit 270 may, for example, include equipment capable of forming spacers according to a photolithography method. In practicing the photolithography method, a photoresist film is formed on the first or second substrate, the photoresist film is selectively irradiated with light (e.g., ultraviolet rays) via a mask having a light blocking region and a light transmission region, and the irradiated photoresist film is developed. Accordingly, portions of the photoresist film remaining after the developing step constitute patterned or column spacers. In one aspect of the present invention, the spacers may be formed on the first base substrate according to the photolithography method and may overlap the black matrix also formed on the first base substrate. In another aspect of the present invention, the spacers may be formed on the second base substrate according to the photolithography method. When patterned or column spacers are formed on the second base substrate, the aforementioned photolithography method may be performed before the second base substrate is loaded into the second alignment treatment unit 210B.

As shown in FIG. 2, after the spacer forming unit 270 forms the spacers, the second base substrate may be cleaned by the second cleaning unit 230B. After the cleaning operation has been performed, the second substrate may be transferred to the second buffer unit 250B and be temporarily held.

After being transferred to respective ones of the first and second buffer units 250A and 250B, the first and second base substrates may be transferred to the attaching unit 280 where they may be attached together.

According to principles of the present invention, if unit LCD panels fabricated using the apparatus described above are to include liquid crystal layers formed according to the aforementioned vacuum injection method, the first and second base substrates, having been attached by the attaching unit 280, may be cut to separate the unit LCD panels from each other. After the separation, liquid crystal material may be injected through liquid crystal injection holes and into the cell-gaps of the unit LCD panels as substantially described above. Subsequently, the liquid crystal injection holes may be sealed to prevent leakage of the injected liquid crystal material outside the unit LCD panel. Therefore, the apparatus shown in FIG. 2 may, for example, include a vacuum chamber 800 similar to the vacuum chamber described above, operatively coupled to the output of the attaching unit 280.

According to principles of the present invention, if unit LCD panels fabricated using the apparatus described above are to include liquid crystal layers formed according to the aforementioned liquid crystal dispensing method, liquid crystal material may be dispensed directly on one of the first or second base substrates prior to attaching the first and second base substrates. Therefore, the apparatus shown in FIG. 2 may, for example, include a liquid crystal dispensing unit 900 for dispensing liquid crystal material directly on either the first or second base substrates. According to principles of the present invention, the liquid crystal dispensing unit 900 may be disposed at substantially any point in the apparatus shown in FIG. 2 operatively before the attaching unit 280. In one aspect of the present invention, the liquid crystal dispensing unit 900 may be operatively coupled between, for example, the first alignment treatment unit 210A/first after-cleaning treatment unit 211A and the seal pattern forming unit 220. In another aspect of the present invention, the liquid crystal dispensing unit 900 may be operatively coupled between, for example, the seal pattern forming unit 220 and the first cleaning unit 230A. In still another aspect of the present invention, the liquid crystal dispensing unit 900 may be operatively coupled between, for example, the disconnection examining unit 240 and the first buffer unit 250A. In yet another aspect of the present invention, the liquid crystal dispensing unit 900 may be operatively coupled between, for example, the second alignment treatment unit 210B/second after-cleaning treatment unit 211B and the Ag dot forming unit 260. In a further aspect of the present invention, the liquid crystal dispensing unit 900 may be operatively coupled between, for example, the Ag dot forming unit 260 and the spacer forming unit 270.

In still a further aspect of the present invention, the liquid crystal dispensing unit 900 may be operatively coupled between, for example, the spacer forming unit 270 and the second cleaning unit 230B. In yet a further aspect of the present invention, the liquid crystal dispensing unit 900 may be operatively coupled between, for example, the second cleaning unit 230B and the second buffer unit 250B. Further, the liquid crystal dispensing unit 900 may be operatively coupled between, for example, either the first or second units 250A or 250B, respectively, and the attaching unit 280.

As described above, the principles of the present invention enable seal patterns to be examined to determine the presence of defective breaks. In one aspect of the present invention, the examination may be accomplished by the aforementioned disconnection examination unit operatively coupled, for example, to an input or an output of a cleaning unit.

Further, the principles of the present invention enable a plurality of seal patterns to be examined simultaneously and/or consecutively, without stopping the overall process of the LCD panel production line. In another aspect of the present invention, base substrates supporting examined seal patterns may be temporarily held in a buffer unit to facilitate substantially continuous LCD panel production.

Still further, the principles of the present invention enable seal patterns formed on a plurality of base substrates to be examined for the presence of defective breaks and also enables one or more substrates supporting the examined seal patterns to be temporarily held in a buffer unit when a processing unit farther along in the production line (e.g., an attaching unit) is not operating.

Moreover, the principles of the present invention enable seal patterns to be rapidly and precisely examined to determine the presence of defective breaks within seal patterns. In one aspect of the present invention, a camera may be used to detect and magnify images of seal patterns.

Further, the principles of the present invention may significantly reduce the generation of defects within the LCD panels caused by the introduction of foreign materials on substrates by eliminating the need for an operator to open and close processing equipment to manually examine the seal patterns. By eliminating the need for an operator to open and close processing equipment to manually examine the seal patterns, the amount of time required to examine the seal patterns may be reduced and the productivity of the LCD panel production line may be increased.

Still further, the principles of the present invention may improve may significantly minimize the waste of material expenses by preventing successive processes from being performed on substrates having seal pattern with defective breaks.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display panel, comprising:

performing a first alignment treatment on a first base substrate;

performing a second alignment treatment on a second base substrate;

forming at least one seal pattern on the alignment-treated first base substrate;

aligning the first base substrate having the at least one seal pattern formed thereon;

driving a disconnection camera along the at least one seal pattern to detect an image of the at least one seal pattern and identify the presence of defective breaks in the at least one seal pattern;

comparing a detected line width of the at least one seal pattern detected by the disconnection camera with a predetermined reference line width of a predetermined reference seal pattern;

generating an alarm when the difference between the detected line width of the at least one seal pattern and the predetermined reference line width of the predetermined reference seal pattern exceeds a threshold value;

cleaning the first base substrate on which the at least one seal pattern has been formed; and attaching the first and second base substrates via the at least one seal pattern.

2. The method of claim 1, wherein forming the at least one seal pattern on the first base substrate comprises:

loading the first base substrate onto a table;

dispensing sealant onto the substrate through syringes; and laterally translating at least one of the table and the syringes along left, right, forward, and backward directions while dispensing the sealant.

3. The method of claim 1, wherein forming the at least one seal pattern on the first base substrate comprises:

aligning a patterned screen mask over the first base substrate, wherein the patterned screen mask selectively exposes regions of the first base substrate; and applying a squeegee over the patterned screen mask to supply sealant to the regions of the first base substrate that are selectively exposed by the patterned screen mask.

4. The method of claim 1, further comprising dispensing liquid crystal material on the first base substrate after performing the first alignment treatment but before attaching the first and second base substrates.

5. The method of claim 1, further comprising dispensing liquid crystal material on the second base substrate after performing the second alignment treatment but before attaching the first and second base substrates.

6. The method of claim 1, further injecting liquid crystal material into a cell gap formed between the attached first and second base substrates.

7. The method of claim 1, further comprising:

forming a plurality of Ag dots on the second base substrate; and forming spacers on the second base substrate prior to attaching the first and second base substrates.

8. The method of claim 7, further comprising cleaning the second base substrate after forming the spacers.

* * * * *